(12) United States Patent
Seto (10) Patent No.: US 11,800,031 B2
(45) Date of Patent: Oct. 24, 2023

(54) IMAGE PROCESSING APPARATUS AND READING CONTROL METHOD

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/907,937

(22) PCT Filed: Mar. 1, 2021

(86) PCT No.: PCT/JP2021/007611
§ 371 (c)(1),
(2) Date: Aug. 29, 2022

(87) PCT Pub. No.: WO2021/177203
PCT Pub. Date: Sep. 10, 2021

(65) Prior Publication Data
US 2023/0010321 A1    Jan. 12, 2023

(30) Foreign Application Priority Data
Mar. 3, 2020  (JP) ................................. 2020-035538

(51) Int. Cl.
*H04N 1/00* (2006.01)
(52) U.S. Cl.
CPC ....... *H04N 1/00798* (2013.01); *H04N 1/0066* (2013.01); *H04N 1/00602* (2013.01); *H04N 1/00615* (2013.01)

(58) Field of Classification Search
CPC .. B65H 1/04; B65H 2220/01; B65H 2220/03; B65H 2403/411; B65H 2405/11425;
(Continued)

(56) References Cited

U.S. PATENT DOCUMENTS 8,705,150 B2 * 4/2014 Shirai ................ H04N 1/00602
358/496
9,555,985 B2 * 1/2017 Kimura ................ H04N 1/0079
(Continued)

FOREIGN PATENT DOCUMENTS

JP        2013031079 A      2/2013

*Primary Examiner* — Negussie Worku
(74) *Attorney, Agent, or Firm* — Alleman Hall Creasman & Tuttle LLP (57) ABSTRACT

An image processing apparatus (10) includes: a restriction processing portion (54) that, in a case where a difference between a separation distance between a pair of regulating portions (15) and a reference distance exceeds a threshold value, restricts execution of a reading process that reads image data of a document sheet place on a document sheet placing portion (11); a determination processing portion (52) that, in a case where an output process that outputs the image data read by the reading process is executed, determines whether or not the output process is a specific fax transmission process that establishes a communication connection for fax communication before execution of the reading process; and a prohibition processing portion (56) that, in a case where it is determined that the output process is the specific fax transmission process, prohibits restriction on the execution of the reading process.

9 Claims, 5 Drawing Sheets

(58) Field of Classification Search
CPC ............ B65H 2511/10; B65H 2511/12; B65H 2511/22; B65H 2511/51; B65H 2511/515; B65H 2553/21; B65H 2553/81; B65H 2553/82; B65H 2557/64; B65H 2801/39; B65H 7/10; B65H 7/20; B65H 9/101; B65H 2511/24; H04N 1/00615; H04N 1/0066; H04N 1/00663; H04N 1/00681; H04N 1/0071; H04N 1/00771; H04N 1/0079
USPC ........................................................ 358/498
See application file for complete search history.

(56) References Cited

U.S. PATENT DOCUMENTS

| | | | |
|---|---|---|---|
| 11,546,482 B2* | 1/2023 | Totsuka | B65H 3/0684 |
| 2016/0083209 A1* | 3/2016 | Kimura | B65H 7/20 |
| | | | 271/248 |
| 2016/0150099 A1* | 5/2016 | Kawaguchi | H04N 1/00824 |
| | | | 358/449 |
| 2017/0036873 A1* | 2/2017 | Sekigawa | B65H 3/66 |
| 2017/0111541 A1* | 4/2017 | Tashiro | H04N 1/2369 |
| 2017/0359484 A1* | 12/2017 | Horiguchi | H04N 1/401 |
| 2018/0034991 A1* | 2/2018 | Osada | H04N 1/3935 |
| 2021/0281695 A1* | 9/2021 | Seto | H04N 1/32713 |
| 2022/0021777 A1* | 1/2022 | Totsuka | H04N 1/00602 |
| 2022/0185607 A1* | 6/2022 | Murata | B65H 3/02 |

* cited by examiner

IMAGE PROCESSING APPARATUS AND READING CONTROL METHOD

TECHNICAL FIELD

The present invention relates to an image processing apparatus and reading control method.

BACKGROUND ART

An image processing apparatus such as a multifunction peripheral device provided with a document sheet conveying device such as an auto document feeder (ADF) is known. In this type of document sheet conveying device, a pair of regulating portions are provided in a document sheet placing portion on which a document sheet to be conveyed is placed. For example, both of the pair of regulating portions can move in a width direction orthogonal to a conveying direction of the document sheet in the document sheet placing portion, and regulate a position in the width direction of the document sheet placed on the document sheet placing portion (see JP 2013-31079 A).

CITATION LIST

Patent Literature

Patent Literature 1: JP 2013-31079 A

SUMMARY OF INVENTION

Technical Problem

In order to prevent the document sheet placed on the document sheet placing portion from being conveyed in an inclined posture, a configuration is conceivable in which, in a case where the difference between a separation distance between the pair of regulating portions and a size of the document sheet exceeds a predetermined threshold value, the execution of a reading process that reads image data of the document sheet is restricted.

However, in a case where the execution of the reading process is restricted based on the separation distance, even after fax communication via a telephone line network with an output destination of the image data read by the reading process is started, execution of the reading process may be restricted during the fax communication, and the communication time of the fax communication may become unnecessarily long.

An object of the present invention is to provide an image processing apparatus and a reading control method that, together with being able to suppress the conveyance of document sheets in an inclined posture, are able to suppress the communication time of fax communication from becoming unnecessarily long.

Solution to Problem

The image processing apparatus according to an aspect of the present invention includes a conveying portion, a pair of regulating portions, a processing execution portion, a restriction processing portion, a determination processing portion, and a prohibition processing portion. The conveying portion conveys a document sheet placed on a document sheet placing portion. The pair of regulating portions are provided in the document sheet placing portion with at least one of the regulating portions being provided so as to be able to move in a width direction orthogonal to a conveying direction of the document sheet, and the pair of regulating portions regulate a position in the width direction of the document sheet. The processing execution portion conveys the document sheet using the conveying portion, and executes a reading process that reads image data of the document sheet. The restriction processing portion restricts execution of the reading process in a case where a difference between a separation distance between the pair of regulating portions and a predetermined reference distance exceeds a predetermined threshold value. The determination processing portion determines, in a case where an output process that outputs the image data read by the reading process is executed, whether or not the output process is a specific fax transmission process that establishes a communication connection for fax communication via a telephone line network with an output destination of the image data before the execution of the reading process. The prohibition processing portion prohibits, in a case where the determination processing portion determines that the output process is the specific fax transmission process, the restriction processing portion from restricting execution of the reading process.

A reading control method according to another aspect of the present invention is executed by an image processing apparatus including a conveying portion that conveys a document sheet placed on a document sheet placing portion, and a pair of regulating portions provided in the document sheet placing portion with at least one of the regulating portions being provided so as to be able to move in a width direction orthogonal to a conveying direction of the document sheet, and the pair of regulating portions regulate a position in the width direction of the document sheet, the reading control method including: conveying the document sheet using the conveying portion, and executing a reading process that reads image data of the document sheet; restricting execution of the reading process in a case where a difference between a separation distance between the pair of regulating portions and a predetermined reference distance exceed a predetermined threshold value; determining, in a case where an output process that outputs the image data read by the reading process is executed, whether or not the output process is a specific fax transmission process that establishes a communication connection for fax communication via a telephone line network with an output destination of the image data before the execution of the reading process; and prohibiting, in a case where it is determined that the output process is the specific fax transmission process, restriction on execution of the reading process based on the difference between the separation distance and the reference distance.

Effect of Invention

With the present invention, an image processing apparatus and a reading control method are achieved that, together with being able to suppress the conveyance of document sheets in an inclined posture, are able to suppress communication time of fax communication from becoming unnecessarily long.

DESCRIPTION OF EMBODIMENTS

Embodiments according to the present invention will be described below with reference to the accompanying drawings. Note that the following embodiments are examples of implementing the present invention and do not limit the technical scope of the present invention.

[Configuration of Image Processing Apparatus 10]

First, configuration of an image processing apparatus 10 according to an present embodiment or the present invention will be described with reference to FIG. 1 and FIG. 2. Here, FIG. 1 is a cross-sectional view showing the configuration of the image processing apparatus 10.

The image processing apparatus 10 is a multifunction peripheral having a plurality of functions such as a scanning function that reads image data from a document sheet, a printing function, a fax function, and a copy function. Note that the image processing apparatus 10 may be a fax device.

Figure 1:
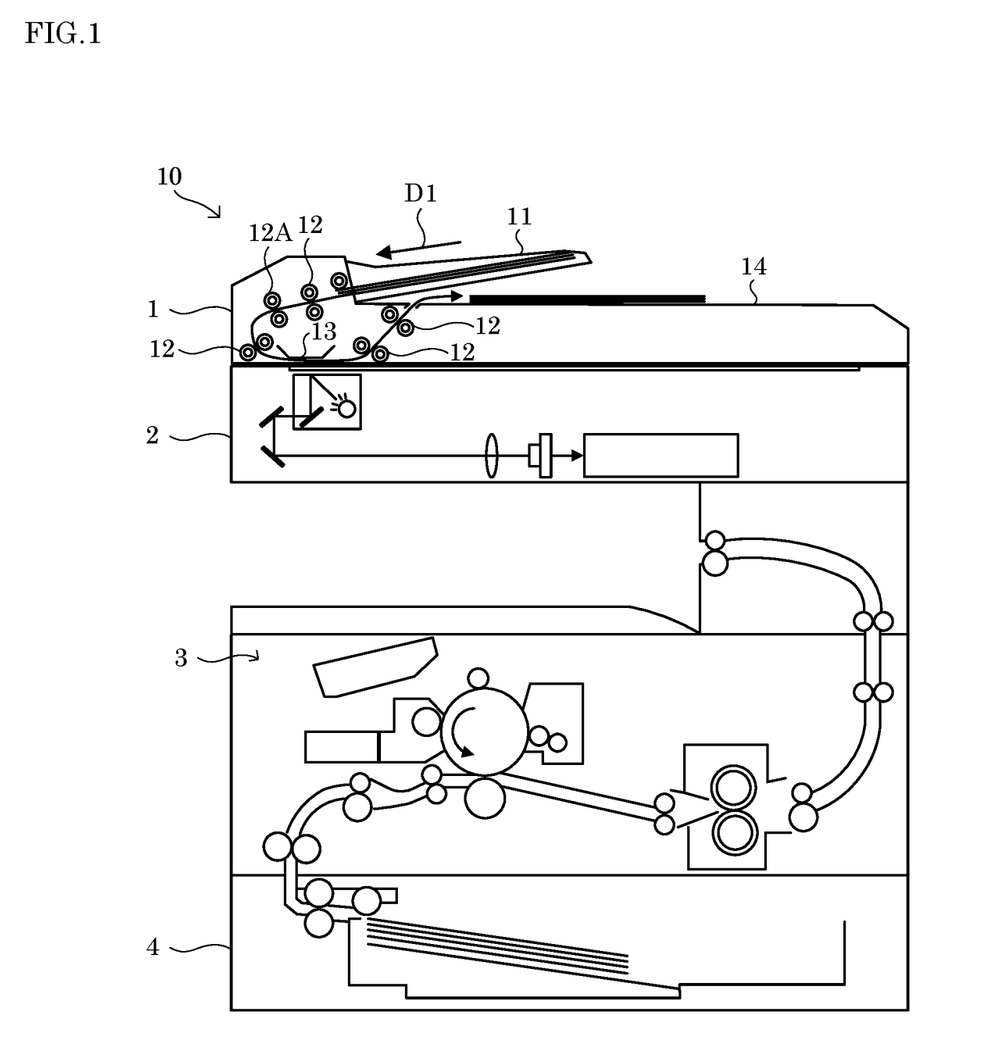
FIG. 1 is a diagram showing a configuration of an image processing apparatus according to an embodiment of the present invention.
Figure 2:
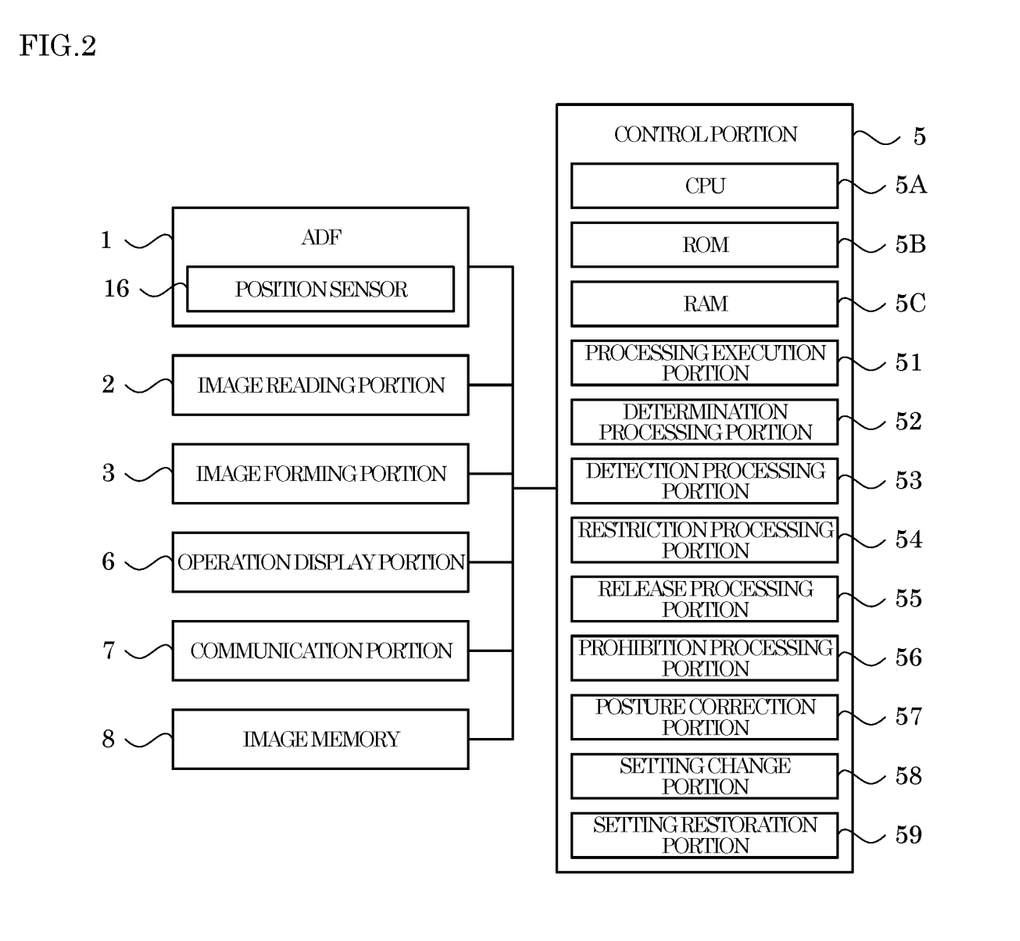
FIG. 2 is a block diagram showing a system configuration of an image processing apparatus according to an embodiment of the present invention.

As shown in FIG. 1 and FIG. 2, the image processing apparatus 10 includes an ADF 1, an image reading portion 2, an image forming portion 3, a sheet feed portion 4, a control portion 5, an operation display portion 6, a communication portion 7, and an image memory 8.

The ADF 1 conveys a document sheet whose image data is to be read by the image reading portion 2.

The image reading portion 2 reads image data from the document sheet. As shown in FIG. 1, the image reading portion 2 includes a document sheet table, a light source, a plurality of mirrors, an optical lens, and a CCD. The image reading portion 2 stores the image data read from the document sheet in the image memory 8.

The image forming portion 3 forms an image on a sheet by an electrophotographic method based on the image data. As shown in FIG. 1, the image forming portion 3 includes a photoconductor drum, a charging roller, a laser scanning unit, a developing device, a transfer roller, a cleaning device, a fixing device, and a sheet discharge tray. Note that the image forming portion 3 may form an image according to another image forming method such as an inkjet method.

The sheet feed portion 4 supplies a sheet to the image forming portion 3. As shown in FIG. 1, the sheet feed portion 4 includes a sheet feed cassette and a plurality of conveying rollers.

The control portion 5 performs overall control of the image processing apparatus 10. As shown in FIG. 2, the control portion 5 includes a CPU 5A, a ROM 5B, and a RAM 5C. The CPU 5A is a processor that executes various types of arithmetic processes. The ROM 5B is a non-volatile storage device in which information such as a control program for causing the CPU 5A to execute various types of processes is stored in advance. The RAM 5C is a volatile storage device used as a temporary storage memory (work area) for various types of processes executed by the CPU 5A. In the control portion 5, various types of control programs stored in advance in the ROM 5B are executed by the CPU 5A. Thus, overall control of the image processing apparatus 10 is performed by the control portion 5. Note that the control portion 5 may be configured by an electronic circuit such as an integrated circuit (ASIC). In addition, the control portion 5 may also be a control portion separately provided from a main control portion that performs overall control of the image processing apparatus 10.

The operation display portion 6 is a user interface of the image processing apparatus 10. The operation display portion 6 has a display portion such as a liquid crystal display that displays various types of information according to a control instruction from the control portion 5, and an operation portion such as operation keys or a touch panel for inputting various types of information to the control portion 5 according to user operation.

The communication portion 7 is an interface for performing data communication with an external communication device connected via a communication network. More specifically, the communication portion 7 executes fax communication with an external fax communication device connected via a telephone network. In addition, the communication portion 7 executes data communication with an external information processing apparatus connected via the Internet or a local area network (LAN).

The image memory 8 stores image data read by the image reading portion 2.

[Configuration of ADF 1]

Next, configuration of an ADF 1 will be described with reference to FIG. 1 to FIG. 3. Here, FIG. 3 is a plan view showing the configuration of the ADF 1.

Figure 3:
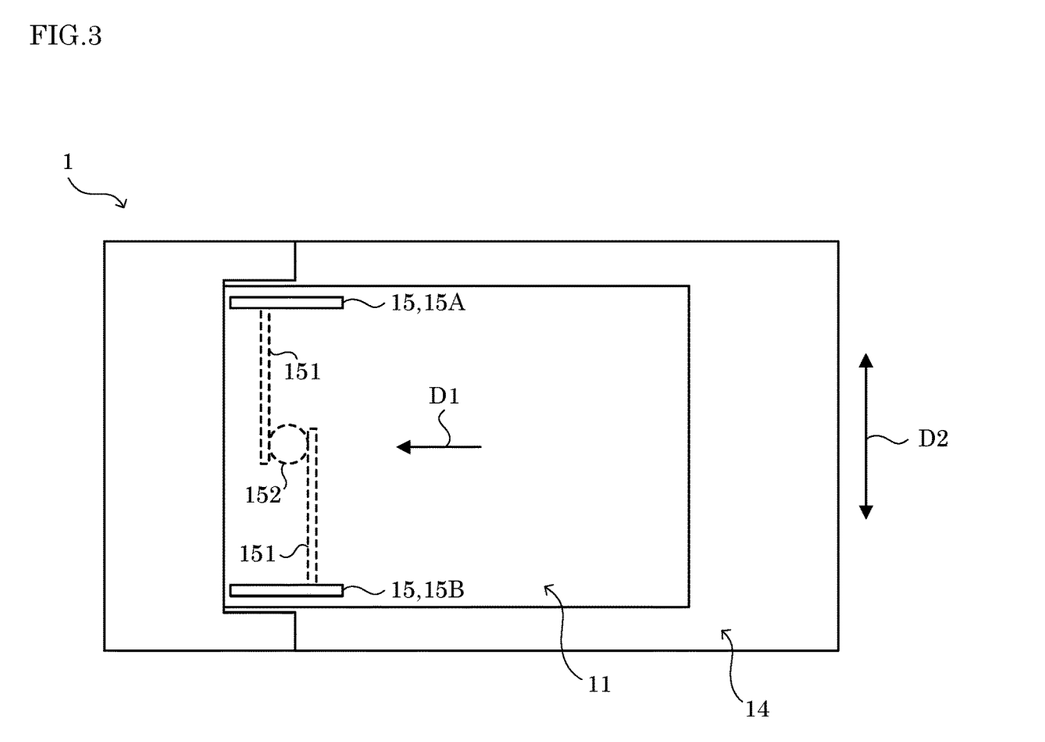
FIG. 3 is a diagram showing a configuration of an ADF of an image processing apparatus according to an embodiment of the present invention.

As shown in FIG. 1 to FIG. 3, the ADF 1 includes a document sheet placing portion 11, a plurality of conveying roller pairs 12 (an example of a conveying portion in the present invention), a document sheet guide 13, a sheet discharge portion 14, a pair of regulating portions 15, and a position sensor 16.

A document sheet from which image data can be read is placed on the document sheet placing portion 11.

The plurality of conveying roller pairs 12 are provided in the document sheet conveying path from the document sheet placing portion 11 to the sheet discharge portion 14. The plurality of conveying roller pairs 12 are provided side by side along the conveying path. The plurality of conveying roller pairs 12, by being driven by a motor (not shown), convey a document sheet placed on the document sheet placing portion 11 to the sheet discharge portion 14 via an image data reading position in the conveying path where image data is read by the image reading portion 2.

The document sheet guide 13 guides the document sheet conveyed by the plurality of conveying roller pairs 12 to the reading position.

The document sheet conveyed by the plurality of conveying roller pairs 12 is discharged to the sheet discharge portion 14.

In the document sheet placing portion 11, the pair of regulating portions 15 regulate the position of the document in a width direction D2 (see FIG. 3) orthogonal to a document sheet conveying direction D1 (see FIGS. 1 and 3) by the plurality of conveying roller pairs 12.

More specifically, in the document sheet placing portion 11, the pair of regulating portions 15 are provided separated from each other in the width direction D2. In addition, a regulating portion 15A (see FIG. 3) and a regulating portion 15B (see FIG. 3) included in the pair of regulating portions 15 are provided such that each is able to move in the width direction D2.

For example, as shown in FIG. 3, the regulating portion 15A and the regulating portion 15B, by being connected to a rack 151 and a pinion 152 provided on a lower side of the document sheet mounting surface of the document sheet placing portion 11, are provided so as to be linked and able to move in directions approaching or separating from each other in the width direction D2.

Note that in the document sheet placing portion 11, it is possible for only one of the regulating portion 15A or the regulating portion 15B to be provided so as to be able to move in the width direction D2, and the other is provided so as to be fixed.

The position sensor 16 detects the separation distance between the pair of regulating portions 15. For example, the position sensor 16 is an electronic circuit including a variable resistor that changes a resistance value according to rotation of the pinion 152. The position sensor 16 outputs an electric signal including information indicating the resistance value of the variable resistor, that is, the separation distance between the pair of regulating portions 15, to the control portion 5.

In order to prevent a document sheet placed on the document sheet placing portion 11 from being conveyed in an inclined posture, a configuration is conceivable in which, in a case where the difference between the separation distance between the pair of regulating portions 15 and a size of the document sheet exceeds a predetermined threshold value, the execution of the reading process that reads image data of the document sheet is restricted.

However, in a case where the execution of the reading process is restricted based on the separation distance between the pair of regulating portions 15, even after fax communication via a telephone line network with an output destination of the image data read by the reading process is started, execution of the reading process may be restricted during the fax communication, and the communication time of the fax communication may become unnecessarily long.

On the other hand, in the image processing apparatus 10 according to an embodiment of the present invention, as will be described below, it is possible to suppress a document sheet from being conveyed in an inclined posture and to suppress communication time of fax communication from becoming unnecessarily long.

More specifically, the ROM 5B of the control portion 5 stores in advance an image output program for causing the CPU 5A to execute an image output process (see FIG. 4) described later. Note that the image output program is recorded on a computer-readable recording medium such as a CD, DVD, or flash memory, and it may also be read from a recording medium and installed in a non-volatile storage device provided in the image processing apparatus 10.

The control portion 5, as shown in FIG. 2, includes a processing execution portion 51, a determination processing portion 52, a detection processing portion 53, a restriction processing portion 54, a release processing portion 55, a prohibition processing portion 56, a posture correction portion 57, a setting change portion 58, and a setting restoration portion 59. More specifically, the control portion 5 uses the CPU 5A to execute the image output program stored in the ROM 5B. Thus, the control portion 5 functions as the processing execution portion 51, the determination processing portion 52, the detection processing portion 53, the restriction processing portion 54, the release processing portion 55, the prohibition processing portion 56, the posture correction portion 57, the setting change portion 58, and the setting restoration portion 59.

The processing execution portion 51 conveys a document sheet placed on the document sheet placing portion 11 by using the plurality of conveying roller pairs 12, and executes the reading process of reading the image data of the document sheet using the image reading portion 2.

The determination processing portion 52, in a case where the output process that outputs the image data read by the reading process is executed, determines whether or not the output process is a first fax transmission process (an example of the specific fax transmission process in the present invention).

Here, the first fax transmission process is a process that establishes a communication connection for fax communication via a telephone line network with the output destination of image data before the execution of the reading process, and after the communication connection has been established, executes the reading process, and transmits the image data stored in the image memory 8 by the reading process to the output destination.

In addition, the output process includes a second fax transmission process and a copy process in addition to the first fax transmission process.

The second fax transmission process is a process that executes the reading process, and after the reading process is completed, establishes a communication connection for the fax communication with the output destination, and transmits the image data stored in the image memory 8 by the reading process to the output destination.

In addition, the copy process is a process that executes the reading process, and outputs the image data stored in the image memory 8 by executing the reading process to the image forming portion 3, and prints an image.

Note that the output process includes a scanning transmission process that executes the reading process, and transmits image data stored in the image memory 8 by executing the reading process to an external communication device connected via a communication network that is different from the telephone line network.

The detection processing portion 53 detects the separation distance between the pair of regulating portions 15. More specifically, the detection processing portion 53 detects the separation distance between the pair of regulating portions 15 using the position sensor 16.

For example, the detection processing portion 53 detects the separation distance between the pair of regulating portions 15 at a predetermined specific timing. For example, the specific timing is a timing after the determination processing portion 52 determines that the output process is not the first fax transmission process and before the reading process is executed.

The restriction processing portion 54 restricts execution of the reading process in a case where the difference between the separation distance between the pair of regulating portions 15 detected by the detection processing portion 53 at the specific timing and a predetermined reference distance exceeds a threshold value.

For example, the reference distance is the distance where the difference between the separation distance between the pair of regulating portions 15 detected by the detection processing portion 53 at the specific timing is the smallest among a plurality of distances in the width direction D2 corresponding to a plurality of predetermined document sheet sizes. For example, the plurality of document sheet sizes are B5 portrait, A4 portrait, and B4 portrait. In addition, the distances of the plurality of width directions D2 corresponding to the plurality of document sheet sizes are 182 cm (length in the lateral direction of the B5 portrait size), 210 cm (length in the lateral direction of the A4 portrait size), and 257 cm (length lateral direction of the B4 portrait size).

In addition, the threshold value is a value stored in advance in the ROM 5B. Note that the threshold value may be arbitrarily set according to a predetermined user operation on the operation display portion 6. In addition, the threshold value may be a different value for each reference distance.

Note that the restriction processing portion 54, in a case where the size of the document sheet to be placed on the document sheet placing portion 11 is set by a user operation on the operation display portion 6, may acquire the distance in the width direction D2 corresponding to the set size as the reference distance.

In a case where execution of the reading process is restricted, the restriction processing portion 54 displays guidance screens on the operation display portion 6 including a first message indicating that execution of the reading process is restricted, a second message instructing the user to operate the pair of regulating portions 15 to align the position of the document sheet placed on the document sheet placing portion 11, and a third message instructing the user to perform a predetermined detection operation after adjusting the position of the document sheet by the pair of regulating portions 15. The restriction processing portion 54 receives the detection operation by the user. For example, the detection operation is a touch operation to an operation icon included on the guidance screen.

Here, the detection processing portion 53 detects the separation distance between the pair of regulating portions 15 in response to the detection operation after the restriction processing portion 54 restricts the execution of the reading process.

Note that the restriction processing portion 54 does not have to receive the detection operation on the guidance screen. In this case, it is conceivable, for example, that the detection processing portion 53 detects the separation distance between the pair of regulating portions 15 in a case where a predetermined time has elapsed from the display timing of the guidance screen.

The release processing portion 55, in either a case where a specific separation distance between the pair of regulating portions 15 detected by the detection processing portion 53 after the restriction processing portion 54 restricts the execution of the reading process is the same as the separation distance between the pair of regulating portions 15 detected by the detection processing portion 53 before a detection timing of the specific separation distance and after the specific timing, or a case where the difference between the specific separation distance between the pair of regulating portions 15 detected by the detection processing portion 53 after the restriction processing portion 54 restricts the execution of the reading process and the reference distance is the same as or less than the threshold value, releases the restriction on the execution of the reading process.

For example, the release processing portion 55, in a case where the specific separation distance between the pair of regulating portions 15 detected by the detection processing portion 53 after the restriction processing portion 54 restricts the execution of the reading process is the same as the separation distance between the pair of regulating portions 15 detected by the detection processing portion 53 immediately before the detection timing of the specific separation distance, releases the restriction on the execution of the reading process.

Note that the release processing portion 55, in a case where the difference between the specific separation distance between the pair of regulating portions 15 detected by the detection processing portion 53 after the restriction processing portion 54 restricts the execution of the reading process and the separation distance between the pair of regulating portions 15 detected by the detection processing portion 53 before the detection timing of the specific separation distance and after the specific timing is equal to or less than an allowable value smaller than the threshold value, may determine that the two separation distances are the same.

In addition, the release processing portion 55, in a case where the specific separation distance between the pair of regulating portions 15 detected by the detection processing portion 53 after the restriction processing portion 54 restricts the execution of the reading process is the same as the separation distance between the pair of regulating portions 15 detected by the detection processing portion 53 at the specific timing, may release the restriction on the execution of the reading process.

In addition, the release processing portion 55 may release the restriction on the execution of the reading process only in a case where the specific separation distance between the pair of regulating portions 15 detected by the detection processing portion 53 after the restriction processing portion 54 restricts the execution of the reading process is the same as the separation distance between the pair of regulating portions 15 detected by the detection processing portion 53 before the detection timing of the specific separation distance and after the specific timing.

In addition, the release processing portion 55 may release the restriction on the execution of the reading process only in a case where the difference between the specific separation distance of the pair of regulating portions 15 detected by the detection processing portion 53 after the restriction processing portion 54 restricts the execution of the reading process and the reference difference is equal to or less than the threshold value.

In addition, the release processing portion 55, in a case where the specific separation distance between the pair of regulating portions 15 detected by the detection processing portion 53 after the restriction processing portion 54 restricts the execution of the reading process is the same as the separation distance between the pair of regulating portions 15 detected by the detection processing portion 53 before the detection timing of the specific separation distance and after the specific timing, may switch whether or not to release the restriction on the execution of the reading process according to the number of document sheets placed on the document sheet placing portion 11.

More specifically, it is possible for the release processing portion 55, in a case where the number of document sheets placed on the document sheet placing portion 11 exceeds a predetermined reference number of sheets, to release the restriction on the execution of the reading process, and in a case where the number of document sheets is equal to or less than the reference number of sheets, to not release the restriction on the execution of the reading process. In this case, the release processing portion 55 may detect the number of document sheets placed on the document sheet placing portion 11 by a method such as using a weight sensor that detects the weight of the document sheets placed on the document sheet placing portion 11.

The prohibition processing portion 56, in a case where the determination processing portion 52 determines that the output process is the first fax transmission process, prohibits the restriction processing portion 54 from restricting the execution of the reading process.

Note that the control portion 5 does not have to include the determination processing portion 52 and the prohibition processing portion 56. In this case, the specific timing is a timing after an execution instruction for executing the output process is input and before the reading process is executed.

The posture correction portion 57, during execution of the reading process, brings a tip end of a document sheet against a predetermined specific roller pair 12A (see FIG. 1) among the plurality of conveying roller pairs 12, and corrects the conveying posture of the document sheet. Here, the specific roller pair 12A is a conveying roller pair 12 arranged at a position different from the most upstream position in the conveying direction D1.

More specifically, the posture correction portion 57, in a case where one document sheet is conveyed from the document sheet placing portion 11, rotates the other conveying roller pairs 12 with the specific roller pair 12A stopped. Thus, the tip end of the document sheet being conveyed from the document sheet placing portion 11 is brought into contact with the specific roller pair 12A and the conveying posture of the document sheet is corrected. After the conveying posture of the document sheet has been corrected, the posture correction portion 57 rotates the specific roller pair 12A to convey the document sheet toward the downstream side in the conveying direction D1.

Here, in a case where the posture correction function for correcting the document sheet conveying posture has been set to be enabled, the posture correction portion 57 corrects the conveying posture of the document sheet. For example, the control portion 5 sets whether to enable or disable the posture correction function for correcting of the conveying posture of the document sheet according to a predetermined setting operation on the operation display portion 6.

The setting change portion 58, in a case where the determination processing portion 52 determines that the output process is the first fax transmission process, and the posture correction function for correcting the conveying posture of the document sheet by the posture correction portion 57 is set to be disabled, sets the correction function to be enabled.

In addition, the setting change portion 58, in a case where the restriction on the execution of the reading process has been released due to the separation distance between the pair of regulating portions 15 detected by the detection processing portion 53 at the second timing being determined to be the same as the separation distance between the pair of regulating portions 15 detected by the detection processing portion 53 at the third timing, and the posture correction function for correcting the conveying posture of the document sheet by the posture correction portion 57 is set to be disabled, sets the posture correction function to be enabled.

Note that it is also possible for the setting change portion 58, in a case where the restriction on the execution of the reading process has been released due to the separation distance between the pair of regulating portions 15 detected by the detection processing portion 53 at the second timing being determined to be the same as the separation distance between the pair of regulating portions 15 detected by the detection processing portion 53 at the third timing, and the posture correction function for correcting the conveying posture of the document sheet by the posture correction portion 57 is disabled, to not change the setting of the posture correction function.

The setting restoration portion 59, in a case where the posture correction function for correcting the conveying posture of the document sheet has been set to be enabled by the setting change portion 58, sets the posture correction function to be disabled after the completion of the reading process.

Note that it is also possible for the control portion 5 to not include the setting restoration portion 59. In addition, it is also possible for the control portion 5 to not include the posture correction portion 57, the setting change portion 58, and the setting restoration portion 59.

[Image Output Process]

Figure 4:
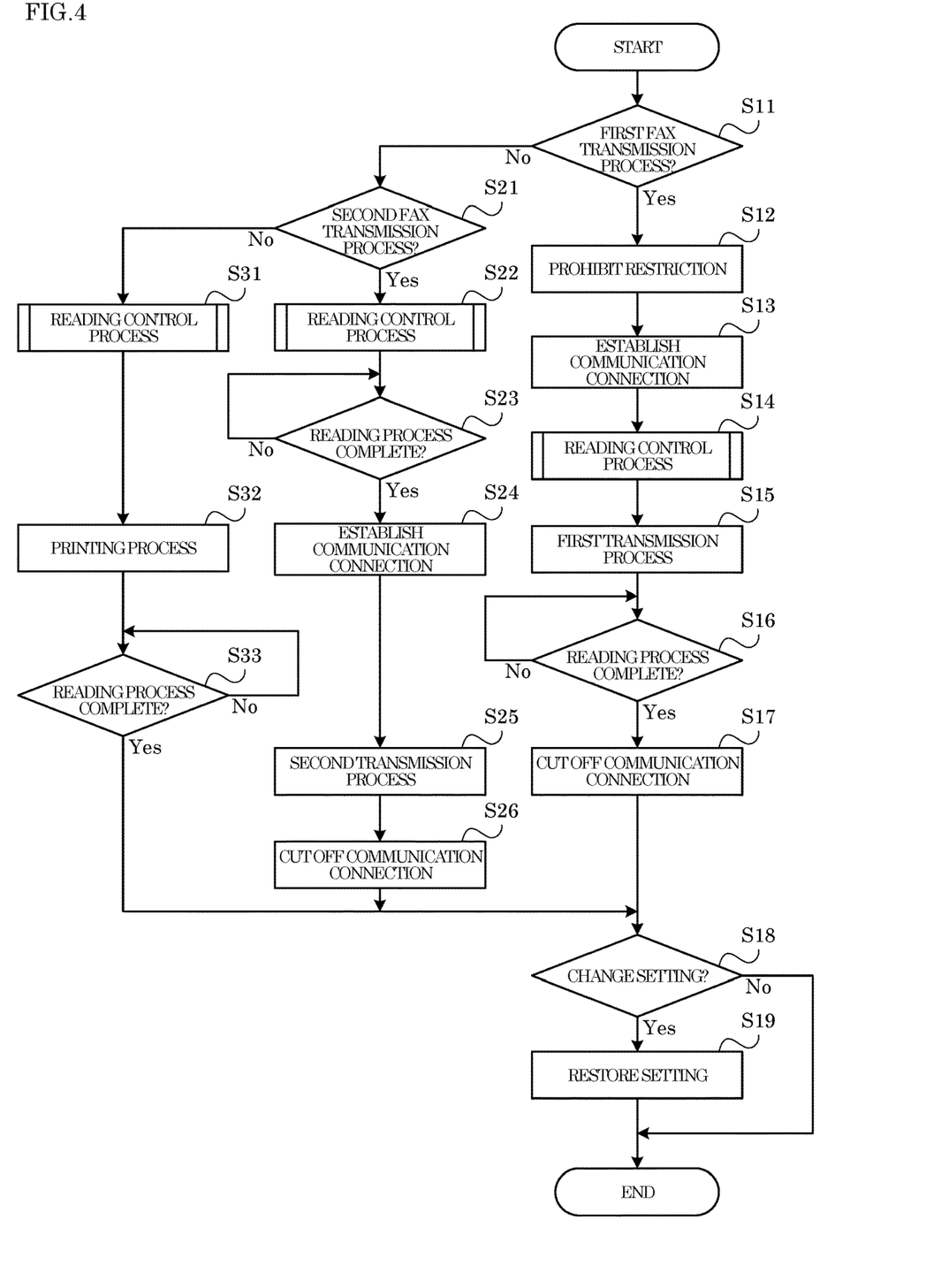
FIG. 4 is a flowchart showing an example of an image output process executed by an image processing apparatus according to an embodiment of the present invention.

Hereinafter, an example of a procedure of an image output process executed by the control portion 5 in the image processing apparatus 10 will be described with reference to FIG. 4. Here, steps S11, S12, and so on represent the number of the processing procedure (step) executed by the control portion 5. Note that the image output process is executed when an instruction to execute the output process has been input.

<Step S11>

First, in step S11, the control portion 5 determines whether or not the output process for which there is an execution instruction is the first fax transmission process. Here, the processing of step S11 is executed by the determination processing portion 52 of the control portion 5.

Here, when the control portion 5 determines that the output process for which there is an execution instruction is the first fax transmission process (YES in step S11), the control portion 5 moves the processing to step S12. In addition, when the output process for which there is an execution instruction is not the first fax transmission process (NO in step S11), the control portion 5 moves the processing to step S21.

<Step S12>

In step S12, the control portion 5 prohibits the restriction on the execution of the reading process based on the difference between the separation distance between the pair of regulating portions 15 and the reference distance. Here, the processing of step S12 is executed by the prohibition processing portion 56 of the control portion 5.

For example, in the image processing apparatus 10, in a case where the image output process is executed, a prohibition flag indicating whether or not the restriction on the execution of the reading process based on the difference between the separation distance between the pair of regulating portions 15 and the reference distance is prohibited is stored in a predetermined first storage area of the RAM 5C. The initial value of the prohibition flag is "0" indicating that the restriction on the execution of the reading process is not prohibited. In step S12, the control portion 5 rewrites the value of the prohibition flag to "1" indicating that the restriction on the execution of the reading process is prohibited.

<Step S13>

In step S13, the control portion 5 establishes a communication connection for fax communication with the output destination.

<Step S14>

In step S14, the control portion 5 executes the reading control process described in a latter stage.

<Step S21>

In step S21, the control portion 5 determines whether or not the output process for which there is an execution instruction is the second fax transmission process.

Here, when the control portion 5 determines that the output process for which there is an execution instruction is the second fax transmission process (YES in step S21), the control portion 5 moves processing to step S22. In addition, when the output process for which there is an execution instruction is not the second fax transmission process (NO in step S21), the control portion 5 moves the processing to step S31.

<Step S22>

In step S22, the control portion 5 executes the reading control process.

<Step S31>

In step S31, the control portion 5 executes the reading control process.

[Reading Control Process]

Figure 5:
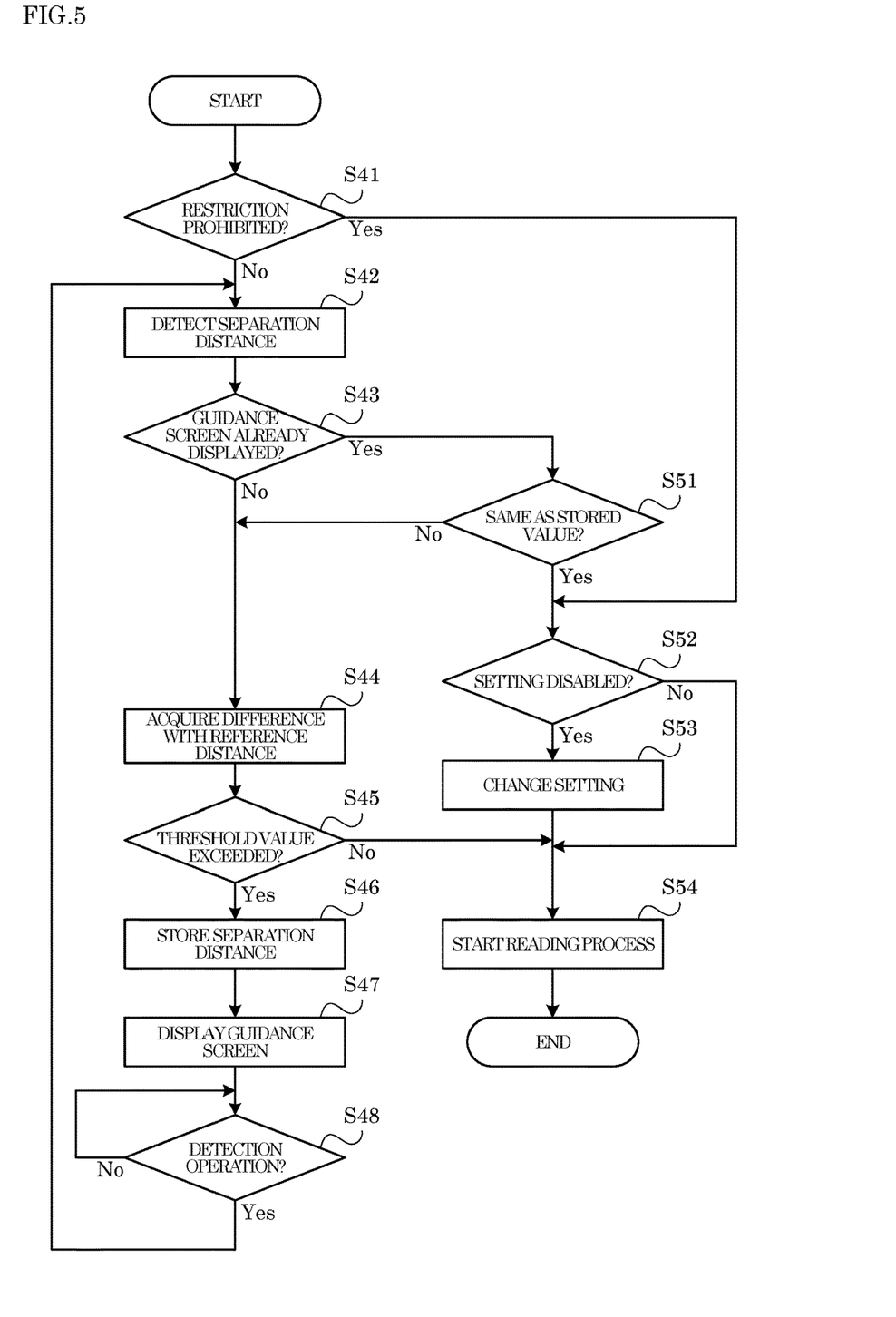
FIG. 5 is a flowchart showing an example of a reading control process executed by an image processing apparatus according to an embodiment of the present invention.

Here, the reading control process executed in step S14, step S22, and step S31 of the image output process will be described with reference to FIG. 5.

<Step S41>

First, in step S41, the control portion 5 determines whether or not the restriction on the execution of the reading process based on the difference between the separation distance between the pair of regulating portions 15 and the reference distance is prohibited.

For example, in a case where the value of the prohibition flag is "1", the control portion 5 determines that the restriction on the execution of the reading process based on the difference between the separation distance between the pair of regulating portions 15 and the reference distance is prohibited.

Here, when the control portion 5 determines that the restriction on the execution of the reading process is prohibited (YES in S41), the control portion 5 moves the processing to step S52. Thus, execution of the processes from step S42 to step S48 for restricting the execution of the reading process is avoided. In addition, when the restriction on the execution of the reading process is not prohibited (NO in S41), the control portion 5 moves the processing to step S42.

<Step S42>

In step S42, the control portion 5 detects the separation distance between the pair of regulating portions 15. Here, the processing of step S42 is executed by the detection processing portion 53 of the control portion 5.

<Step S43>

In step S43, the control portion 5 determines whether or not the guidance screen has already been displayed. Note that, the control portion 5 is able to determine whether or not the guidance screen has been displayed based on whether or not the separation distance is stored in a second storage area of the RAM 5C, which will be described below.

Here, when the control portion 5 determines that the guidance screen has already been displayed (YES in S43), the control portion 5 moves the processing to step S51. In addition, when the guidance screen has not already been displayed (NO in S43), the control portion 5 moves the processing to step S44.

<Step S44>

In step S44, the control portion 5 acquires the difference between the separation distance detected in step S42 and the reference distance.

<Step S45>

In step S45, the control portion 5 determines whether or not the acquired value acquired in step S44 exceeds the threshold value.

Here, when the control portion 5 determines that the acquired value acquired in step S44 does not exceed the threshold value (NO in S45), the control portion 5 moves the processing to step S54. In step S54, execution of the reading process is started. That is, the control portion 5, in a case where acquired value acquired in step S44 does not exceed the threshold value, allows execution of the reading process. On the other hand, when the control portion 5 determines that the acquired value acquired in step S44 exceeds the threshold value (YES in S45), the control portion 5 restricts the execution of the reading process by moving the process to step S46. Here, the processing of step S45 is executed by the restriction processing portion 54 of the control portion 5.

<Step S46>

In step S46, the control portion 5 stores the separation distance detected in step S42 in a predetermined second storage area in the RAM 5C. More specifically, the control portion 5 overwrites and stores the separation distance detected in step S42 in the second storage area. Note that the second storage area is, for example, a storage area newly secured in the RAM 5C at the start of execution of the image output process.

<Step S47>

In step S47, the control portion 5 displays the guidance screen. Here, the processing of step S47 is executed by the restriction processing portion 54 of the control portion 5.

<Step S48>

In step S48, the control portion 5 determines whether or not the detection operation has been performed on the guidance screen.

Note that the guidance screen may include a fourth message informing that the restriction on the execution of the reading process will be released by performing the detection operation without operating the pair of regulating portions 15.

Here, when the control portion 5 determines that the detection operation has been performed on the guidance screen (YES in S48), the control portion 5 moves the processing to step S42. In addition, when the detection operation has not been performed (NO in S48), the control portion 5 waits for the detection operation to be performed in step S48.

<Step S51>

In step S51, the control portion 5 determines whether or not the separation distance detected in step S42 and the separation distance stored in the second storage area are the same.

Here, when the control portion 5 determines that the separation distance detected in step S42 and the separation distance stored in the second storage area are the same (YES in S51), the control portion 5 moves the processing to step S52. In step S54, which is executed after step S52, execution of the reading process is started. That is, the control portion 5, in a case where it is determined that the separation distance detected in step S42 and the separation distance stored in the second storage area are the same, releases the restriction on the execution of the reading process. On the other hand, when the separation distance detected in step S42 and the separation distance stored in the second storage area are not the same (NO in S51), the control portion 5 moves the processing to step S44. In this case, in step S45, which is executed after step S44, in a case where it is determined that the acquired value acquired in step S44 does not exceed the threshold value, the restriction on the execution of the reading process is released. Here, the processing of step S51 and the second and subsequent processing of step S45 are executed by the release processing portion 55 of the control portion 5.

<Step S52>

In step S52, the control portion 5 determines whether or not the posture correction function for correcting the conveying posture of the document sheet by the posture correction portion 57 is set to be disabled.

Here, when the control portion 5 determines that the posture correction function for correcting the conveying posture of the document sheet by the posture correction portion 57 is set to be disabled (YES in S52), the control portion 5 moves the processing to step S53. In addition, when the posture correction function for correcting the conveying posture of the document sheet by the posture correction portion 57 is not set to be disabled (NO in S52), the control portion 5 moves the processing to step S54.

<Step S53>

In step S53, the control portion 5 sets the posture correction function for correcting the conveying posture of the document sheet by the posture correction portion 57 to be enabled. Here, the processing of step S53 is executed by the setting change portion 58 of the control portion 5.

<Step S54>

In step S54, the control portion 5 starts execution of the reading process. Here, the processing of step S54 is executed by the processing execution portion 51 of the control portion 5.

This concludes the description of the reading control process, and the description of image output process will be resumed.

<Step S15>

In step S15, the control portion 5 executes a first transmission process that transmits the image data stored in the image memory 8 by the reading process, the execution of which was started in step S54 of the reading control process, to the output destination with which the communication connection for fax communication was established in step S13.

<Step S16>

In step S16, the control portion 5 determines whether or not the reading process, the execution of which was started in step S54 of the reading control process, has been completed.

Here, when the control portion 5 determines that the reading process is completed (YES in S16), the control portion 5 moves the processing to step S17. In addition, when the reading process is not completed (NO in S16), the control portion 5 waits for the reading process to be completed in step S16.

<Step S17>

In step S17, the control portion 5 cuts off the communication connection for fax communication with the output destination.

<Step S18>

In step S18, the control portion 5 determines whether or not the posture correction function for correcting the conveying posture of the document sheet has been set to be enabled in step S53 of the reading control process.

Here, when the control portion 5 determines that the posture correction function for correcting the conveying posture of the document sheet has been set to be enabled (YES in S18), the control portion 5 moves the processing to step S19. In addition, when the posture correction function for correcting the conveying posture of the document sheet has not been set to be enabled (NO in S18), the control portion 5 terminates the image output process.

<Step S19>

In step S19, the control portion 5 sets the posture correction function for correcting the conveying posture of the document sheet to be disabled. Here, the processing of step S19 is executed by the setting restoration portion 59 of the control portion 5.

<Step S23>

In step S23, the control portion 5 determines whether or not the reading process, the execution of which was started in step S54 of the reading control process, has been completed.

Here, when the control portion 5 determines that the reading process is completed (YES in S23), the control portion 5 moves the processing to step S24. In addition, when the reading process is not completed (NO in S23), the control portion 5 waits for the reading process to be completed in step S23.

<Step S24>

In step S24, the control portion 5 establishes a communication connection for fax communication with the output destination.

<Step S25>

In step S25, the control portion 5 executes a second transmission process that transmits the image data stored in the image memory 8 by the reading process, the execution of which was started in step S54 of the reading control process, to the output destination with which the communication connection for fax communication was established in step S24.

<Step S26>

In step S26, the control portion 5 cuts off the communication connection for fax communication with the output destination.

<Step S32>

In step S32, the control portion 5 executes a printing process that prints the image data stored in the image memory 8 by the reading process, the execution of which was started in step S54 of the reading control process.

<Step S33>

In step S33, the control portion 5 determines whether or not the reading process, the execution of which was started in step S54 of the reading control process, has been completed.

Here, when the control portion 5 determines that the reading process is completed (YES in S33), the control portion 5 moves the processing to step S18. In addition, when the reading process is not completed (NO in S33), the control portion 5 waits for the reading process to be completed in step S33.

In this way, in the image processing apparatus 10, in a case where the first fax transmission is executed, restriction on the execution of the reading process based on the separation distance of the pair of regulating portions 15 is prohibited. Thus, the restriction on the execution of the reading process based on the separation distance between the pair of regulating portions 15 during fax communication is avoided. Therefore, together with being possible to suppress the document sheet from being conveyed in an inclined posture, it is possible to suppress the communication time of fax communication from becoming unnecessarily long.

Note that the sheet feed portion 4 may include a manual feed tray in which sheets to be fed to the image forming portion 3 are placed, and a pair of regulating portions that are provided in the manual feed tray and that regulate a position of a sheet placed in the manual feed tray in the width direction, with at least one of the regulating portions being provided so as to be able to move in a width direction orthogonal to the conveying direction of the sheet by the sheet feed portion 4. In this case, the present invention may be applied to the sheet feed portion 4. That is, the specific process may be a printing process in which a sheet placed in the manual feed tray is conveyed by using the sheet feed portion 4, and an image based on image data is formed on the sheet.

The invention claimed is:

1. An image processing apparatus, comprising:
    a conveying portion configured to convey a document sheet placed on a document sheet placing portion;
    a pair of regulating portions provided in the document sheet placing portion with at least one of the regulating portions being provided so as to be able to move in a width direction orthogonal to a conveying direction of the document sheet, the pair of regulating portions configured to regulate a position in the width direction of the document sheet;
    a processing execution portion configured to convey the document sheet using the conveying portion, and to execute a reading process that reads image data of the document sheet;
    a restriction processing portion configured to restrict execution of the reading process in a case where a difference between a separation distance of the pair of regulating portions and a predetermined reference distance exceeds a predetermined threshold value;
    a determination processing portion configured to determine, in a case where an output process that executes the reading process and outputs the image data read by the reading process is executed, whether or not the output process is a specific fax transmission process that establishes a communication connection for fax communication via a telephone line network with an output destination of the image data before the execution of the reading process; and
    a prohibition processing portion configured to prohibit, in a case where the determination processing portion determines that the output process is the specific fax transmission process, the restriction processing portion from restricting execution of the reading process.

2. The image processing apparatus according to claim 1, wherein
    the conveying portion includes a plurality of conveying roller pairs arranged side by side along the conveying direction; and
    the image processing apparatus further comprises:
        a posture correction portion configured to correct, during execution of the reading process, a conveying posture of the document sheet by bringing a tip end of the document sheet in contact with a specific roller pair of the plurality of conveying roller pairs arranged at a position different from a most upstream position in the conveying direction; and
        a setting change portion configured to, in a case where the determination processing portion determines that the output process is the specific fax transmission process, and a posture correction function for correcting the conveying posture of the document sheet by the posture correction portion is set to be disabled, set the posture correction function to be enabled.

3. The image processing apparatus according to claim 2, further comprising:
    a setting restoration portion configured to, in a case where the posture correction function set to be enabled by the setting change portion, set the posture correction function to be disabled after completion of the reading process.

4. The image processing apparatus according to claim 1, further comprising:
    an image forming portion configured to form an image based on the image data read in the reading process.

5. A reading control method executed by an image processing apparatus comprising a conveying portion configured to convey a document sheet placed on a document sheet placing portion, and a pair of regulating portions provided in the document sheet placing portion with at least one of the regulating portions being provided so as to be able to move in a width direction orthogonal to a conveying direction of the document sheet, the pair of regulating portions configured to regulate a position in the width direction of the document sheet, the reading control method comprising:
    conveying the document sheet using the conveying portion, and executing a reading process that reads image data of the document sheet;
    restricting execution of the reading process in a case where a difference between a separation distance between the pair of regulating portions and a predetermined reference distance exceed a predetermined threshold value;
    determining, in a case where an output process that executes the reading process and outputs the image data read by the reading process is executed, whether or not the output process is a specific fax transmission process that establishes a communication connection for fax communication via a telephone line network with an output destination of the image data before the execution of the reading process; and
    prohibiting, in a case where it is determined that the output process is the specific fax transmission process, restriction on execution of the reading process based on the difference between the separation distance and the reference distance.

6. The reading control method according to claim 5, wherein the specific fax transmission process includes a first fax transmission process that establishes the communication connection for the fax communication via the telephone line network with the output destination of the image data before the execution of the reading process.

7. The reading control method according to claim 6, wherein the output process includes a second fax transmission process that executes the reading process, and after the reading process is completed, establishes the communication connection for the fax communication with the output destination, and transmits the image data by the reading process to the output destination.

8. The image processing apparatus according to claim 1, wherein the specific fax transmission process includes a first fax transmission process that establishes the communication connection for the fax communication via the telephone line network with the output destination of the image data before the execution of the reading process.

9. The image processing apparatus according to claim 8, wherein the output process includes a second fax transmission process that executes the reading process, and after the reading process is completed, establishes the communication connection for the fax communication with the output destination, and transmits the image data by the reading process to the output destination.

* * * * *